United States Patent
Labrecque (10) Patent No.: US 10,954,147 B2
(45) Date of Patent: Mar. 23, 2021

(54) SYSTEM AND METHOD FOR TREATMENT OF WASTEWATER

(71) Applicants: TECHNOLOGIES ECOFIXE INC., Laval (CA); Marisol Labrecque, Sainte-Marthe-sur-le-Lac (CA)

(72) Inventor: Marisol Labrecque, Sainte-Marthe-sur-le-Lac (CA)

(*) Notice: Subject to any disclaimer, the term of this patent is extended or adjusted under 35 U.S.C. 154(b) by 0 days.

(21) Appl. No.: 16/084,612

(22) PCT Filed: Mar. 14, 2017

(86) PCT No.: PCT/CA2017/050332
§ 371 (c)(1),
(2) Date: Sep. 13, 2018

(87) PCT Pub. No.: WO2017/156626
PCT Pub. Date: Sep. 21, 2017

(65) Prior Publication Data
US 2019/0071334 A1 Mar. 7, 2019

Related U.S. Application Data

(60) Provisional application No. 62/307,932, filed on Mar. 14, 2016.

(51) Int. Cl.
*C02F 3/10* (2006.01)
*C02F 3/06* (2006.01)
(Continued)

(52) U.S. Cl.
CPC ............... *C02F 3/10* (2013.01); *C02F 3/006* (2013.01); *C02F 3/06* (2013.01); *C02F 3/20* (2013.01);
(Continued)

(58) Field of Classification Search
CPC .... Y02W 10/18; C02F 2103/007; C02F 3/10; C02F 3/20; C02F 7/00; C02F 3/103; C02F 2201/007; C02F 3/087; B63B 35/32
(Continued)

(56) References Cited

U.S. PATENT DOCUMENTS 3,235,234 A 2/1966 Beaudoin
5,421,999 A 6/1995 Poole et al.
(Continued)

FOREIGN PATENT DOCUMENTS

WO 2016061664 A1 4/2016

OTHER PUBLICATIONS

International Search Report of PCT Application No. PCT/CA2017/050332; dated Jun. 17, 2017; Pham, T.

*Primary Examiner* — Claire A Norris
(74) *Attorney, Agent, or Firm* — Benoit & Cote, Inc.; Mathieu Miron (57) ABSTRACT

There is described a system for the treatment of a wastewater in a pond or lagoon containing a volume of water. The system comprises at least one enclosure comprising growth media and/or substrate therein for growing bacteria and/or biomass. The at least one enclosure is configured in the pond or lagoon to receive a volume of wastewater flowing therethrough from the pond or lagoon over a treatment period, and is configured to treat substantially the entire volume of water flowing through the pond or lagoon over time. A plurality of growth media and/or substrate can be provided in a given enclosure. Different enclosures may comprise different growth media and substrate therein.

13 Claims, 7 Drawing Sheets

(51) Int. Cl.
  *C02F 3/00*   (2006.01)
  *C02F 3/20*   (2006.01)
  *C02F 3/34*   (2006.01)
  *C02F 3/30*   (2006.01)
  *C02F 103/00*   (2006.01)

(52) U.S. Cl.
  CPC .............. *C02F 3/101* (2013.01); *C02F 3/105* (2013.01); *C02F 3/302* (2013.01); *C02F 3/348* (2013.01); *C02F 2103/007* (2013.01); *C02F 2203/006* (2013.01); *Y02W 10/10* (2015.05)

(58) Field of Classification Search
  USPC ........ 210/242.2, 170.05, 615, 170.09, 242.1, 210/747.6, 747.9
  See application file for complete search history.

(56) References Cited

U.S. PATENT DOCUMENTS

| | | | |
|---|---|---|---|
| 2005/0269262 A1 | 12/2005 | McBride | |
| 2009/0206032 A1* | 8/2009 | Wickham | C02F 3/06 210/615 |
| 2011/0108472 A1* | 5/2011 | Kania | A01G 31/02 210/151 |
| 2012/0279919 A1* | 11/2012 | Atzmon | C02F 3/08 210/610 |
| 2017/0313607 A1* | 11/2017 | Boutet | C02F 3/006 |

\* cited by examiner

SYSTEM AND METHOD FOR TREATMENT OF WASTEWATER

CROSS-REFERENCE TO RELATED APPLICATIONS

This application is a US National Phase application under 35 USC § 371 of PCT/CA2017/050332, filed Mar. 14, 2017, which claims priority from and the benefit of U.S. Provisional Patent Application No. 62/307,932, filed Mar. 14, 2016, the specifications of which are hereby incorporated by reference in their entireties.

BACKGROUND

(a) Field

The subject matter disclosed generally relates to a system and method for the treatment of wastewater. More specifically, the subject matter relates to a wastewater treatment system to be installed in a pond or lagoon.

(b) Related Prior Art

Water contamination, is a widespread problem around the world which can be attributed in part to urban sprawling and industrial development along waterway systems. Open air ponds or lagoons of natural or artificial origin are frequently employed for the treatment of wastewater. However, there are common problems with their use that remain to be addressed. Ponds or lagoons have a maximum capacity for the treatment of wastewater which may be reached over time and after which it is not possible to treat effectively and efficiently further volumes of incoming wastewater and/or further organic load in the incoming wastewater. Also, the performance of ponds and/or lagoons for the treatment of wastewater may be inadequate on many levels. Moreover, the capacity of these ponds or lagoons to treat the wastewater is recurrently disrupted by heavy rains, or other massive flow of water into their environment. The incoming overflow of water causes the beneficial bacteria and biomass to be washed out of the ponds or lagoons, which greatly decreases their treatment performance.

Therefore, there is a need for a system that would improve and/or stabilize the treatment performance of such bodies of water.

Moreover, existing systems are either hard to install in existing aerated ponds or lagoons, or are not suitable to treat the whole volume of incoming wastewater and/or organic load in the water in the pond or lagoon, or imply the use of mechanical equipment such as pipes and pumps which increase the cost and complexity of the system.

There is a need for a system that would treat water in such bodies of water, and improve the performance of aerated ponds or lagoons throughout the years. There is further a need for an increased ease of installation, operation and maintenance of treatment systems that are added into existing ponds, as well as the insurance that the whole volume of water is treated by such systems.

Furthermore, the existing systems are usually directed to the treatment of specific pollutants in the water. Therefore, they can lack the versatility that could be needed in some circumstances.

SUMMARY

According to an aspect of the invention, there is provided a system for the treatment of a wastewater in a pond or lagoon containing a volume of water, the system comprising:

at least one enclosure comprising therein one of
a growth media,
a substrate, or
a combination thereof,
for growing at least one of bacteria or biomass therein; and
wherein said at least one enclosure is configured to receive a volume of said wastewater flowing therethrough from said pond or lagoon over a treatment period, and wherein said at least one enclosure is configured to treat substantially an entire volume of water flowing through said pond or lagoon over time.

According to another embodiment, the system is configured to cross a whole width of the pond or lagoon, or a whole flat portion width of said pond or lagoon.

According to an embodiment, the at least one enclosure comprises a plurality of growth media.

According to an embodiment, the at least one enclosure comprises a plurality of substrate.

According to an embodiment, system comprises two or more enclosures.

According to an embodiment, the two or more enclosures comprise different growth media therein, different substrate therein, or combinations thereof.

The growth media may have a two-, or three-dimensional shape.

The growth media may be filled or hollow.

The substrate may be chosen from a zeolite, an aluminosilicate, a charcoal, a char, a biochar, a microporous calcium carbonate material, or combinations thereof.

The system may further comprise an anchoring portion, attached to the enclosure, to secure the system in place.

The anchoring portion may be configured to receive a cable.

The anchoring portion may be configured to contact an underwater ground surface.

The enclosure may further comprise at least one live bacteria culture, a live biomass, or a combination thereof.

The system may further comprise an aeration system.

The aeration system may be configured to provide oxygen to the growth medium, to provide a movement of the growth medium within said enclosure, or combinations thereof.

The growth medium may a fluidized medium, a fixed medium, or a combination thereof.

The system may further comprise a monitoring system, operatively connected to the system and configured to obtain and communicate measurements concerning the performance of said system.

The system may further comprise a sludge removal system.

The system may further comprise means to direct substantially an entire volume of water flowing through the pond or lagoon over time through said system.

The at least one enclosure may further comprise means to direct substantially an entire volume of water flowing through said pond or lagoon over time through the system.

The enclosure may be floatable.

According to another aspect of the invention, there is provided method of treating wastewater comprising:
in a pond or lagoon, contacting a volume of wastewater with at least one system according to the present invention, for a time sufficient for treatment of said wastewater,
wherein an entirety of the wastewater flowing through said pond or lagoon is treated by system.

The wastewater may comprise any one of an organic contaminant, a non-organic contaminant, a metallic contaminant, a biological oxygen demand over 5 days (BOD5), a soluble BOD5, a chemical oxygen demand (COD), a total suspended solids (TSS), phosphorus, ammonia nitrogen, nitrite, nitrate, a fecal coliform, a total coliform, a absorbable organic halogen, a metal atom, or combinations thereof.

The pond or lagoon may be an aerated pond or lagoon, an anaerobic aerated pond or lagoon, a wastewater treatment plant, or combinations thereof.

The amount of growth media in the system may be proportional to a quantity of live microorganism in said system required for treatment of said wastewater.

The amount of substrate in the system may be proportional to a quantity of live microorganism in said system required for treatment of said wastewater.

The method may further comprise the step of seeding the volume of wastewater with an exogenous live bacteria culture, an exogenous live biomass, or a combination thereof.

The method may comprise two or more system according to the present invention.

In the method of the present invention, each of the system may provide a same or a different treatment function.

The entirety of the wastewater flowing through the pond or lagoon may be forced to flow through the system According to another aspect of the invention, there is provided a system for the treatment of a wastewater comprising:

at least one floatable enclosure adapted to retain at least one growth medium therein and capable of contacting the wastewater; and at least one anchoring portion attached to the floatable enclosure to secure said system in place.

The floatable enclosure may be at least one of a buoy, a floating platform, a dock portion, a dockside portion, a gabion and a floating gabion.

The anchoring portion may be adapted to receive at least one cable.

The at least one anchoring portion may be at least one of a handle, a hook, a rod, or combinations thereof.

The at least one anchoring portion may be adapted to contact an underwater ground surface.

The anchoring portion may be an anchor.

The anchoring portion may be a weight.

The anchoring portion may be at least one of a pole and a pillar inserted in the underwater ground surface.

The system may be further comprising at least one growth medium in the floatable enclosure.

The medium may be for growth of a live bacteria culture, a live biomass, or both.

The growth medium may further comprise at least one of a live bacteria culture, a live biomass, or both.

According to another embodiment, there is provided a method of treating wastewater comprising:

maintaining in a volume of wastewater at least one system according to the present invention for a treatment of wastewater.

According to another embodiment, there is provided a method of treating wastewater comprising:

in a pond or lagoon, contacting a volume of wastewater with at least one system according to the present invention, for a treatment of said wastewater.

The at least one system may be placed above an oxygen diffuser to provide oxygen to the system to promote growth therein of the live bacteria culture, the live biomass, or both.

The oxygen diffuser may provide a movement of the wastewater within said floatable enclosure.

The growth medium present in the floatable enclosure may be proportional to a quantity of a live bacteria culture, a live biomass, or both to be obtained in the volume of wastewater.

The method may further comprise seeding the volume of wastewater with an exogenous live bacteria culture, an exogenous live biomass, or both.

The method may further comprise seeding a growth medium in said floatable enclosure with an exogenous live bacteria culture, an exogenous live biomass, or both.

The live bacteria culture, the live biomass, or both are endogenous to the volume of wastewater and grow in the floatable enclosure.

The live bacteria, the live biomass, adhere to the growth medium.

The at least one system may be anchored to a ground surface with at least one cable.

The at least one cable may be retained to the ground surface with at least one of a concrete block, a rod, a pin, a hook and a pole.

The at least one system may be anchored to an underwater ground surface.

The following terms are defined below.

The term "growth media" or "growth medium" is intended to mean a solid substrate having defined two and/or three dimensional shapes and structures, which may be filled or hollow, and are made of a material that is compatible with bacterial, microorganismal and biomass growth. The growth medium as used in the present invention provides sufficient surface area and support for bacterial, microorganismal and biomass growth.

The term "substrate" is intended to mean treatment solid material or matter that capture toxins that biological treatment cannot degrade, such as metal atoms. The substrate may also provide additional bulk and surface area within the enclosure for the treatment of wastewater. The substrate may be for example zeolite or other aluminosilicate material having microporous structures of natural or synthetic origins, charcoal, char, biochar, microporous calcium carbonate materials of natural or synthetic origins (for example crushed or powdered bones).

The term "gabion" is intended to mean a wirework container such as is a cage, cylinder, or box filled, filled materials such as rock, broken concrete, sand, soil or other material, used in the construction of dams, retaining walls, etc. In the context of the present invention, the materials may be for example the growth media, the substrate, or combinations thereof.

The term "pond" is intended to mean a body of standing water, either natural or artificial, that is usually smaller than a lake. According to the present invention, the ponds may contain shallow water, and are created specifically for water treatment. In embodiments, the edges of the pond may be sloped, and the slope may be steep, or may be gentle, or any inclination therebetween. In an embodiment, the edges may be at a substantially right angle.

The term "lagoon" is intended to mean a shallow body of water separated from a larger body of water by a barrier. In the present context, the lagoon may be natural or man-made, and used for wastewater treatment, as is the case for e.g. aerated lagoons and anaerobic lagoons. In embodiments, the edges of the lagoon may be sloped, and the slope may be steep, or may be gentle, or any inclination there between. In an embodiment, the edges may be at a substantially right angle.

The terms "microorganism" or "live microorganism" is intended to mean the collective quantity of (live) bacteria, and (live) biomass in the system of the present invention.

Before describing the present invention in detail, a number of terms will be defined. As used herein, the singular forms "a", "an", and "the" include plural referents unless the context clearly dictates otherwise.

It is noted that terms like "preferably", "commonly", and "typically" are not utilized herein to limit the scope of the claimed invention or to imply that certain features are critical, essential, or even important to the structure or function of the claimed invention. Rather, these terms are merely intended to highlight alternative or additional features that can or cannot be utilized in a particular embodiment of the present invention.

For the purposes of describing and defining the present invention it is noted that the term "substantially" is utilized herein to represent the inherent degree of uncertainty that can be attributed to any quantitative comparison, value, measurement, or other representation. The term "substantially" is also utilized herein to represent the degree by which a quantitative representation can vary from a stated reference without resulting in a change in the basic function of the subject matter at issue.

Features and advantages of the subject matter hereof will become more apparent in light of the following detailed description of selected embodiments, as illustrated in the accompanying figures. As will be realized, the subject matter disclosed and claimed is capable of modifications in various respects, all without departing from the scope of the claims. Accordingly, the drawings and the description are to be regarded as illustrative in nature, and not as restrictive and the full scope of the subject matter is set forth in the claims.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENTS

In one embodiment, there is disclosed a system and a method for the treatment of wastewater. More specifically, the present invention relates to a system, preferably floatable, that may include enclosures, such as gabions, containing growth media and/or substrates to favor the growth of bacteria and/or biomass therein, and methods of using the same for the treatment of wastewater. The waste water to be treated may contain organic, non-organic, and metallic contaminants, biological oxygen demand over 5 days (BOD5), soluble BOD5, chemical oxygen demand (COD), total suspended solids (TSS), phosphorus, ammonia nitrogen, nitrite, nitrate, fecal coliforms, total coliforms, absorbable organic halogens, metals. The system of the present invention makes no use of chemicals for the treatment of the wastewater. Systems according to the present invention may be used in municipal as well as industrial settings, for example agricultural settings, pulp and paper settings, mining and oil settings.

Figure 1:
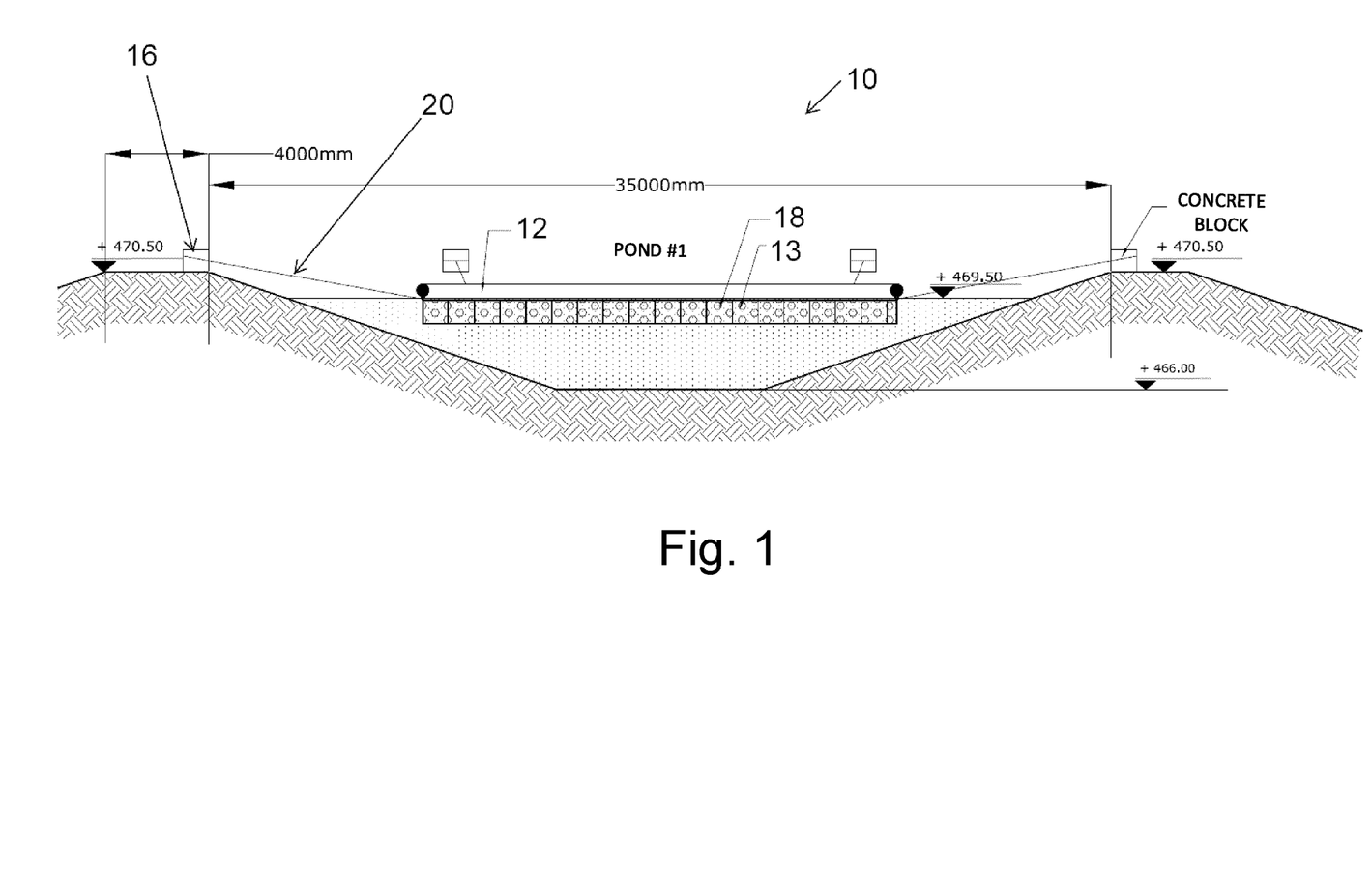
FIG. 1 is a side view illustrating a system for the treatment of wastewater, according to an embodiment of the present invention.

Referring now to the drawings, and more particularly to FIG. 1, there is shown a system 10 for the treatment of a wastewater which includes at least one enclosure 12, being adapted to retain a growth medium therein and capable of contacting the wastewater and at least one anchoring portion 16 which may be attached to the floatable enclosure 12 to secure the system 10 for the treatment of a wastewater in place. The enclosure 12 is preferably floatable and, in this case, may be a buoy, a floating platform, a dock portion, a dockside portion, a gabion, a floating gabion and the like.

Figure 8:
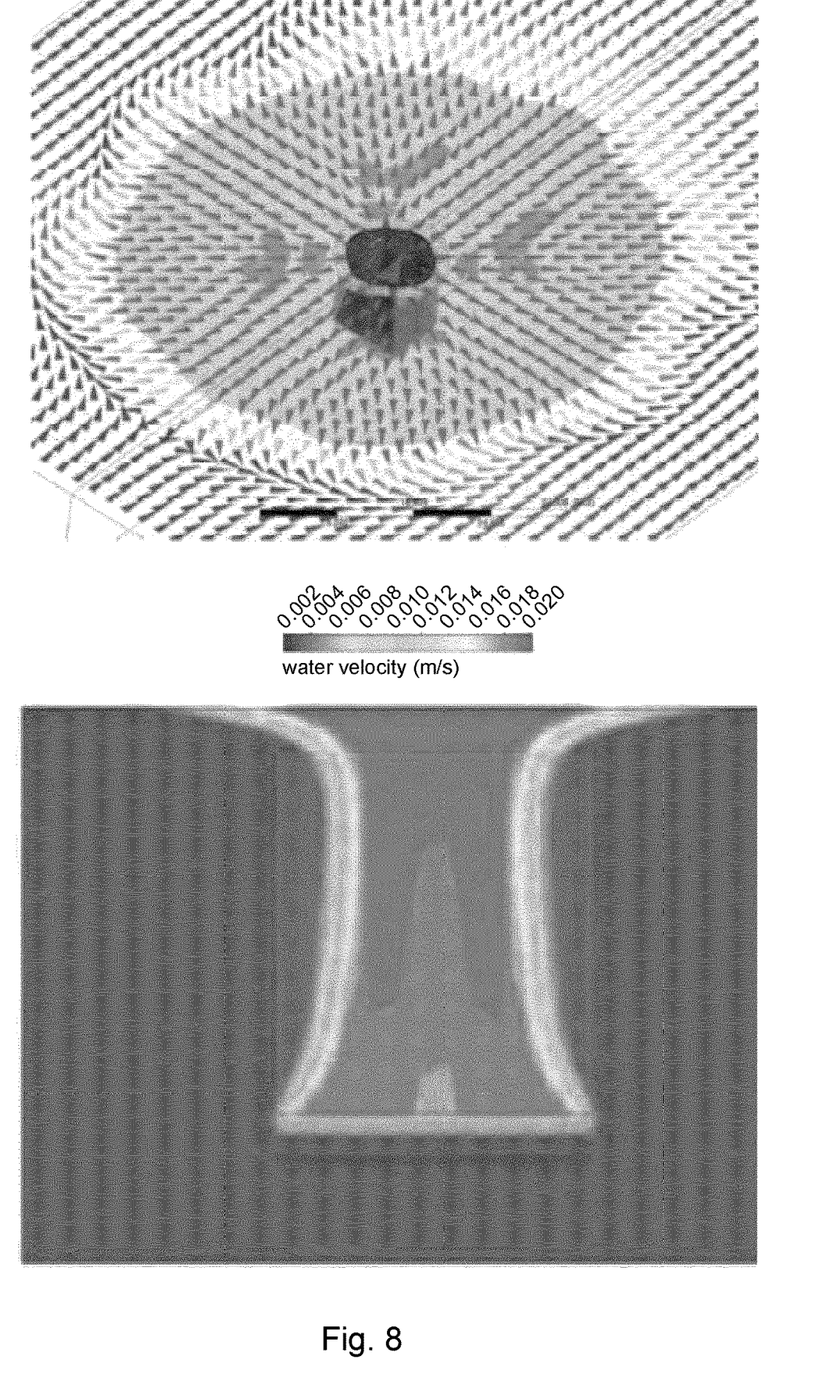
FIG. 8 illustrates the radiation treatment effect provided by a system of the present invention. Left panel is a plan view, and the right panel is a sectional view, which show the impact on the flow velocity through the system of the present invention.

The at least one enclosure is configured to receive a volume of wastewater flowing therethrough from the pond or lagoon over a treatment period, and to treat substantially an entire volume of water flowing through the pond or lagoon over time. In embodiments, the system may be configured to cross a whole width of said pond or lagoon, and in another embodiment, the system may be configured to cross a whole flat portion width of the pond or lagoon. In embodiments, the system is capable of treating substantially the entire volume of water flowing through the pond or lagoon over time through its positioning in the natural hydraulic flow of the pond or lagoon. Furthermore, the system of the present invention has a radiation effect, where the treatment effect of the system of the present invention radiates from the system, as shown in FIG. 8, and documented in ML: Howland, W. E. (1958). Flow Over Porous Media as in a Trickling Filter. Proc. 12th Ind. Waste Conf., May 13, 14 and 15, 1957, Extension Series No. 94, Engineering Bulletin 42(3), D. E. Bloodgood, ed., Purdue University, Lafayette, Ind., incorporated herein by reference. FIG. 8 illustrates the impact on the flow velocity through the system of the present invention. That is, beyond the enclosure itself, the effect of the system of the present invention is still present. The system of the present invention does not need to have an enclosure that goes all the way to the bottom of the pond or lagoon in order to treat substantially the entire volume of water flowing through the pond or lagoon over time. Indeed, in some embodiments, this is disadvantageous, as it would provide insufficient space for the sludge to come off the system and rest at the bottom thereof. By having space under the system 10, and by not being in contact with the bottom of the pond or lagoon, the system 10 of the present invention is not affected by the sludge produced by the system and the pond itself.

Therefore, when designing a system 10 according to the present invention, the size of the enclosure is calculated in order to include the radiation effect that will be sufficient to treat substantially the entire volume of water flowing through the pond or lagoon over time, including the volume that flows under or on the sides of the system. In embodiments where the radiation effects is deems insufficient, means to force the flow of water to pass through the enclosure(s) 12 may be used. For example, in some embodiments, the flow of water on each side of the enclosures may be blocked. In another embodiment, a floating curtain may be installed downstream, leaving the system open over the entire portion of the system, but blocking the slope on each side and physically force water to flow through to the system 10 of the present invention. Therefore, the system 10 may further comprise means to direct substantially the entire volume of water flowing through the pond or lagoon over time through the system 10. In embodiments, the system 10 may comprise at least one enclosure 12 comprising means to direct substantially an entire volume of water flowing through the pond or lagoon over time through the system.

The enclosure 12 used in the system 10 of the present invention may be of any suitable shape and make, and is adapted to receive and retain therein growth media that will sustain the growth of microorganisms (live bacteria cultures, live microorganisms, live biomass and the like) and/or substrates that will capture toxins that biological treatment cannot degrade, such as metal atoms. The enclosure 12, according to a preferred embodiment, may comprise only growth media. According to another embodiment, the enclosure 12 may comprise growth media and substrate. According to some embodiments, the enclosure may be loaded with from about 40% to about 100%, or from about 50% to about 100%, or from about 60% to about 100%, or from about 70% to about 100%, or from about 80% to about 100%, or from about 90% to about 100%, or from about 40% to about 90%, or from about 50% to about 90%, or from about 60% to about 90%, or from about 70% to about 90%, or from about 80% to about 90%, or from about 40% to about 80%, or from about 50% to about 80%, or from about 60% to about 80%, or from about 70% to about 80%, or from about 40% to about 70%, or from about 50% to about 70%, or from about 60% to about 70%, or from about 40% to about 60%, or from about 50% to about 60%, or from about 0% to about 50% media, substrate, or combinations thereof.

Figure 2A:
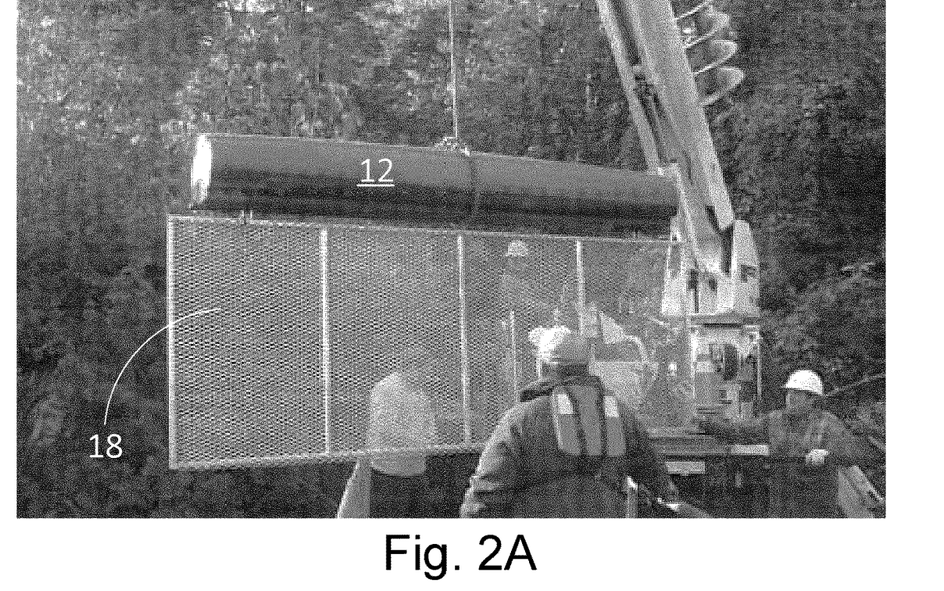
FIG. 2A is a picture illustrating a floating wall which may be employed for creating a floatable enclosure, according to an embodiment of the present invention.
Figure 2B:
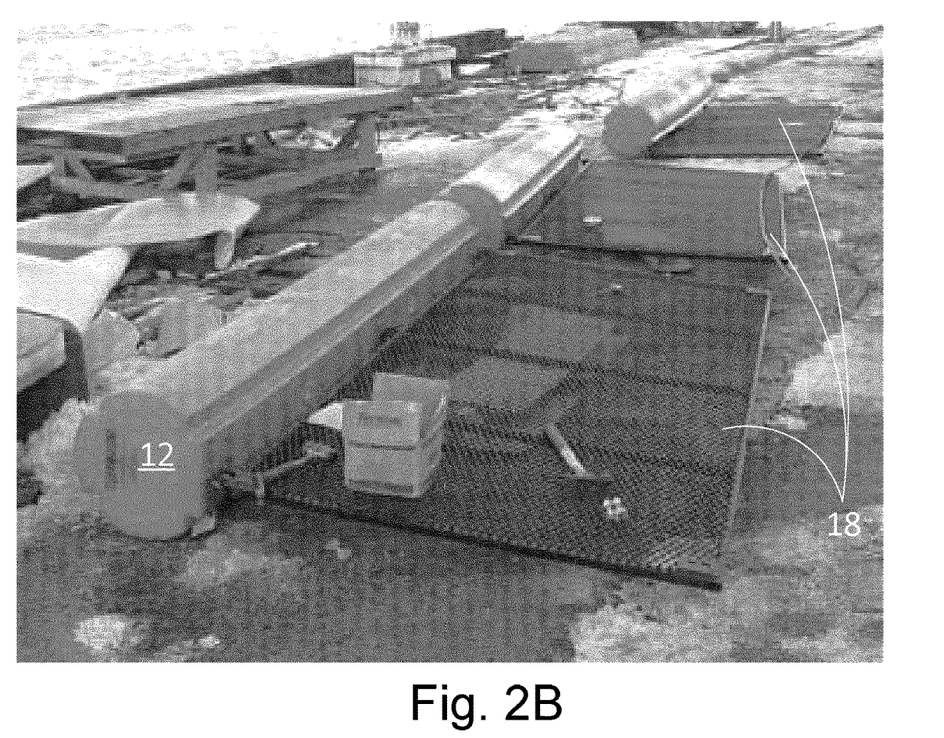
FIG. 2B is a picture illustrating a floating wall which may be employed for creating a floatable enclosure, according to an embodiment of the present invention.

The live bacteria cultures, the live biomass may degrade the polluting compounds present in the water of the pond or lagoon. After their normal lifetime in the pond and/or lagoon, spent bacteria and/or biomass will become suspended particulate matter which may sediment at the bottom of the pond and/or lagoon. Alternatively, as the wastewater is moved or transferred to other wastewater (secondary and tertiary) purification systems along the wastewater treatment system, the suspended particulate matter may be filtered away. Now referring to FIGS. 2A-2B, there is show a retention wall 18 which is an example of one of the wall (e.g. front or back wall) of the enclosure 12 according to the present invention. Retention wall 18 is capable of retaining the culture media therein while letting in the wastewater.

Furthermore, the enclosure 12 is capable of contacting the wastewater, retain the bacteria therein and releasing a by-product in suspension, namely the biomass, in the volume of wastewater being treated, thereby maintaining and/or renewing the bacterial activity in the volume of wastewater. The bacteria/biomass, when it dies, naturally detaches from the media, which leads to natural regeneration of live bacteria and/or biomass on the media.

According to another embodiment, the anchoring portion 16 of the system 10 for the treatment of a wastewater may be adapted to receive at least one cable 20. In another embodiment, the anchoring portion 16 of the system 10 for the treatment of a wastewater may be a handle, a hook, a rod, or combinations thereof.

Referring now to another embodiment, the anchoring portion 16 of the system 10 for the treatment of a wastewater may be adapted to contact an underwater ground surface (e.g. a weight, an anchor, or the like). The underwater ground surface may be included without restrictions in the group consisting of: rock, sand, clay, sediments, or any underwater ground surface. Artificial basin or pond ground surfaces are also contemplated in this invention.

In another embodiment, the anchoring portion 16 of the system 10 for the treatment of a wastewater may include at least one of a pole and a pillar inserted in the underwater ground surface.

In another embodiment, the system 10 for the treatment of a wastewater may further include any suitable growth media 13 known in the art in the enclosure 12.

Figure 6:
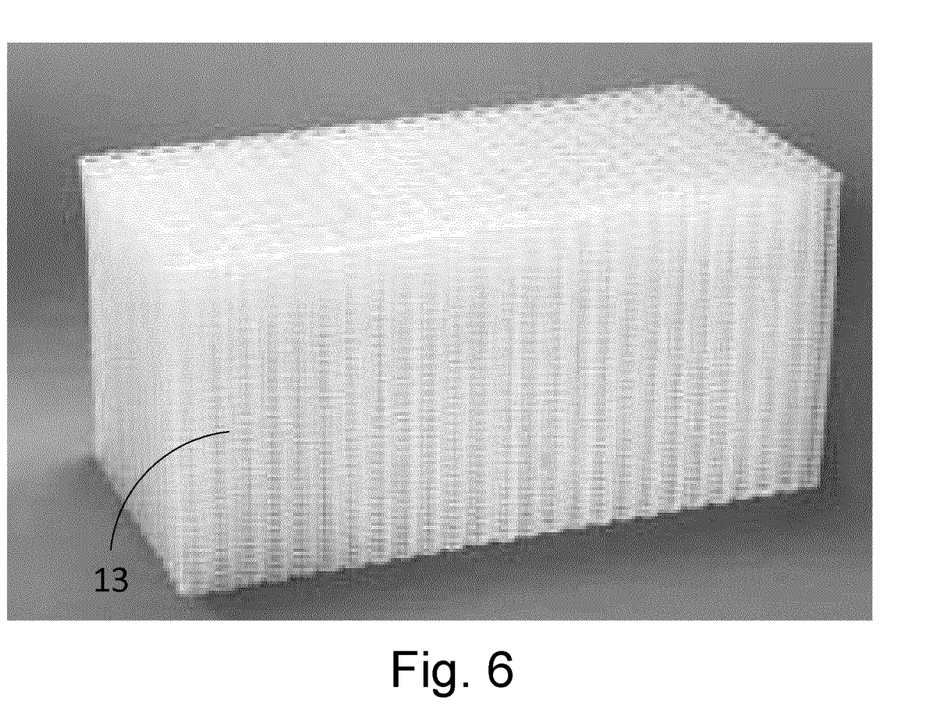
FIG. 6 is a picture of a growth medium, according to an embodiment of the present invention.
Figure 7:
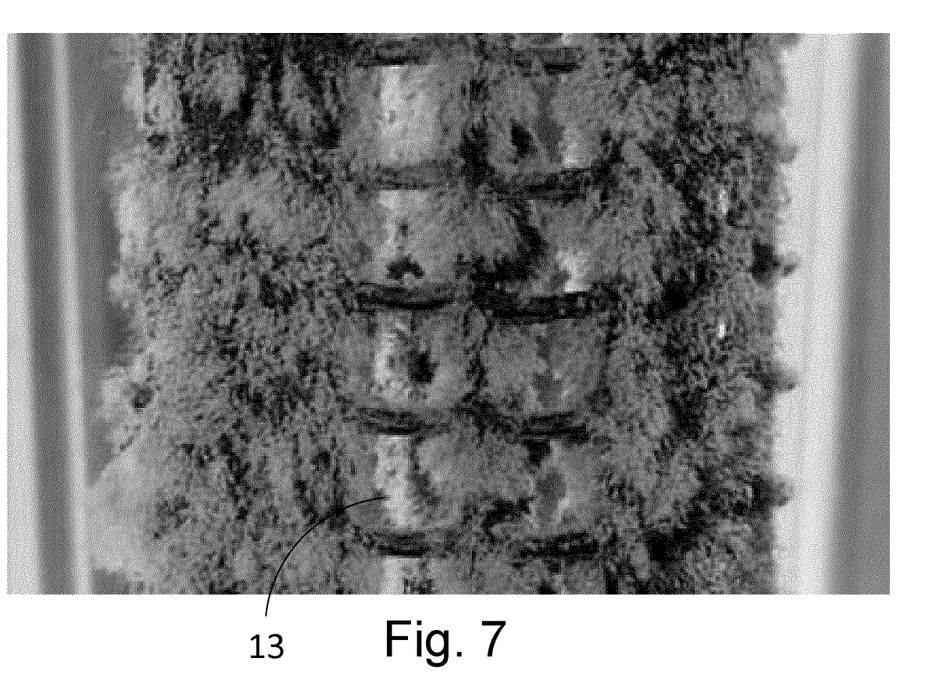
FIG. 7 is a picture of a growth medium under use, according to an embodiment of the present invention.

In another embodiment, the growth media of the system 10 for the treatment of a wastewater may be a growth media 13 (e.g. plastic Bio-Rings® or Kompakt® from Jeager Products, Inc.) such as shown in FIGS. 6-7, for a live bacteria culture already present in the pond and/or lagoon, a live biomass already present in the pond and/or lagoon, or both.

Furthermore, according to another embodiment, the system 10 for the treatment of a wastewater may further include in the enclosure 12 at least one of a live bacteria culture, a live biomass, or both. The live bacteria culture, live biomass, or both may be present in the enclosure 12 to provide additional bacteria and/or biomass. This may be done for example to add specific bacteria and/or biomass for the destruction or biodegradation of nitrates (e.g. ammoniacal nitrogen) and other undesirable chemicals present in the wastewater.

According to another embodiment, the system of the present invention may also comprise communication, sampling, telemetry systems, or the likes, configured to remotely monitor the system of the present invention to obtain and communicate measurements concerning the performance of the present invention in real time. In embodiments, the systems of the present invention may be used autonomously, without the presence of an operator monitoring them.

According to another embodiment, there is described a method of treating wastewater which may include the step of maintaining and retaining in a volume of wastewater a live biomass for a treatment of the wastewater as presented above.

According to another embodiment, there is provided a method of treating wastewater which may include the step, in a pond or lagoon, of contacting a volume of wastewater with at least one system according to the present invention, for a treatment of said wastewater. The system of the present invention may be installed in any suitable pond or lagoon, for example those found in anaerobic aerated ponds, wastewater treatment plants, or the likes.

In use, an aeration system 30, such as an oxygen diffuser, may be placed underneath a system 10 to provide oxygen to the growth medium, and promote growth of the live bacteria culture, the live biomass, or the like. Also, the aeration system 30 may provide a movement of the growth medium within the enclosure 12. The aeration system 30 ensures that the amount of biomass does not become too large. Too much biomass on the media leads to clogging risks, and increases the risk of creating anaerobic zones in the enclosures. Optimally, a thin layer of biomass all over the media should be present. According to another embodiment, the live bacteria, the live biomass of the method of treating wastewater may adhere to the media 13 (FIG. 1). Importantly, the system of the present invention reduces energy (e.g. electrical energy), since the aeration system 30 is highly performing and consumes less power.

According to another embodiment, the amount of growth medium 13 in the enclosure 12 may be proportional to a quantity of live bacteria culture or to a quantity of live biomass to optimize wastewater treatment. According to another embodiment, the amount of substrate in the enclosure 12 may be proportional to a quantity of live bacteria culture or to a quantity of live biomass to optimize wastewater treatment. The treatment of wastewater may be optimized by providing the volume of wastewater with concentrations of bacteria, biomass or both, that provide an optimal degradation of the polluting compounds.

Therefore, according to another embodiment, the method of treating wastewater may further include steps of seeding the volume of wastewater, with an exogenous live bacteria culture, or the like, exogenous live biomass, or both. These supplementations in exogenous live bacteria culture or exogenous live biomass may be performed to optimize the efficiency of the wastewater treatment pond. The amount of growth media 13, the amount of substrate, the total amount of bacteria (including endogenous and/or exogenous bacteria) and the total amount of biomass (including endogenous and/or exogenous biomass) present in the enclosure 12 may be adapted to the wastewater being treated in order to obtain the desired treatment activity.

The supplementation or seeding may be necessary to introduce new strains of bacteria or biomass in order to degrade polluting compounds that the live bacteria culture, the live biomass, or both, endogenous to the wastewater treatment pond are less effective at or unable of degrading.

According to another embodiment, at least one system 10 according to the present invention may be anchored to a ground surface surrounding the pond of wastewater being treated, with at least one cable 20. The ground surface may be rock, sand, clay, and the like, or a combination thereof. The at least one cable 20 of may be retained to the ground surface with at least one of a concrete block, a rod, a pin, a hook and a pole.

According to another embodiment, at least one system 10 of the method of treating wastewater may be anchored to an underwater ground surface.

According to another embodiment, the growth media 13 may comprise a fluidized media and/or substrate. As used herein, the term fluidized media means a solid media (substrate, or their combination) that moves within the fluid as if the mixture was a fluid. A movement needs to be provided to the mixture (media and liquid) to fluidize the media. According to an embodiment, the movement is brought by the aeration system 30, provided as a fine bubble generator, which generates bubbles within the enclosure and provides movement to the water and media 13. In this embodiment, the media 13 is not attached to any part of the system 10, since it needs to move within the enclosure. However, the retention walls 18 should keep the fluidized media within the enclosure 12.

According to another embodiment, the growth media 13 comprises a fixed media. For example, a bloc shaped media may be disposed within the enclosure and be retained in a fixed position by the walls of the enclosure. The results of the treatment by fixed media and fluidized media can be substantially different, both in terms of results and also in terms of what biological matter or chemical is being removed from the wastewater. This is because different types of bacteria or biomass can develop preferentially depending on the type of media 13 being used, When the growth media 13 is a fixed media, there can still be provided aeration even though the aeration will not provide movement to the growth media 13 as for the fluidized media. In this case, the aeration system can play two roles. First, it provides oxygen to the bacteria or biomass that is living on the growth media 13 and/or substrates, since oxygen is needed to sustain life which biodegrades pollutants. Second, the flow of air bubbles within the fixed growth media 13 ensures that there is no clogging or excessive accumulation or depletion of living matter in specific parts of the fixed growth media 13; in other words, it makes the spatial distribution of bacteria and biomass more even within the enclosure 12, thereby removing preferential paths that may have formed inside the growth media 13 or substrate. The existence of preferential paths is undesirable since it means that matter to be degraded may be in contact with only a small fraction of the media 13, and some parts of the media 13 may not be oxygenated well, which can cause biochemical disequilibrium. The aeration system 30 is provided to prevent such problems.

According to an embodiment, there is provided a sludge removal system (not shown). The sludge removal system removes sludge from the growth media 13. According to an embodiment, the sludge removal system is used only during maintenance periods and not during normal operation. The sludge removal system can comprise an additional aeration system that generated mid-size bubbles that can dislodge solid materials (such as sludge and/or dead bacteria and biomass) from within the growth media 13. The solid materials in excess are lifted through the growth media 13 by the mid-size bubbles up to the surface of the pond or lagoon, where they can be removed from the pond or lagoon by mechanical action (i.e., manually collected) or by pumping the surface.

Physical properties of the growth medium, most notably the shape and material of the growth medium, may have a substantial impact on the type of bacteria or biomass that develops on the growth medium. For example, by altering the shape of a growth medium, the type of bacteria favored by the change of shape may be different.

The choice of a given growth medium to be used in the system 10 acts on the exact type of bacteria or biomass that will develop thereon. Since each type of bacteria or biomass treats substances in the wastewater in its own particular way, the way the system 10 acts upon the polluting compounds in the wastewater can be engineered by selecting an adequate growth medium for the purpose that is contemplated. In an exemplary embodiment, in order to better degrade ammoniacal nitrogen, the shape of the growth medium 13 is configured to be a shape that is known to favor growth of nitrifying bacteria. According to another embodiment, the composition of the material (e.g. plastic) of the growth medium 13 may be adapted to one known to favor growth of nitrifying bacteria.

According to an embodiment, the growth media 13 is made of an inert material such as plastic or rubber. For example, the growth media 13 can be a tubular media, such as the Kompakt® tubular block media manufactured by Raschig USA inc (Arlington, Tex.), which is intended to be used as a fixed media. This tubular media is made of extruded HDPE (high-density polyethylene) tubes, which are heat welded together to form rugged blocks, as shown in FIG. 7. Without limitation, these blocks can be cubes with sides of about 24" or 60 cm, for example. Openings are formed within the block in every direction, which favors growth of organisms on the media 13, as illustrated in FIG. 7. Vertical channels, such as the lumen of the tubes, provide an escape way for solid materials, which can fall immediately, thereby avoiding clogging.

In embodiments, the characteristics that are desirable in the material of the media 13 include a density that is close to that of water but slightly higher, for the media to stay under the surface of water, without being too high so as not to outrightly sink, or in the case of a fluidized media, if the media are too heavy, aeration will not be able to create the necessary movement). Additional characteristics include resistance to UV so as to prevent degradation of the media by exposure to the sun.

Figure 3:
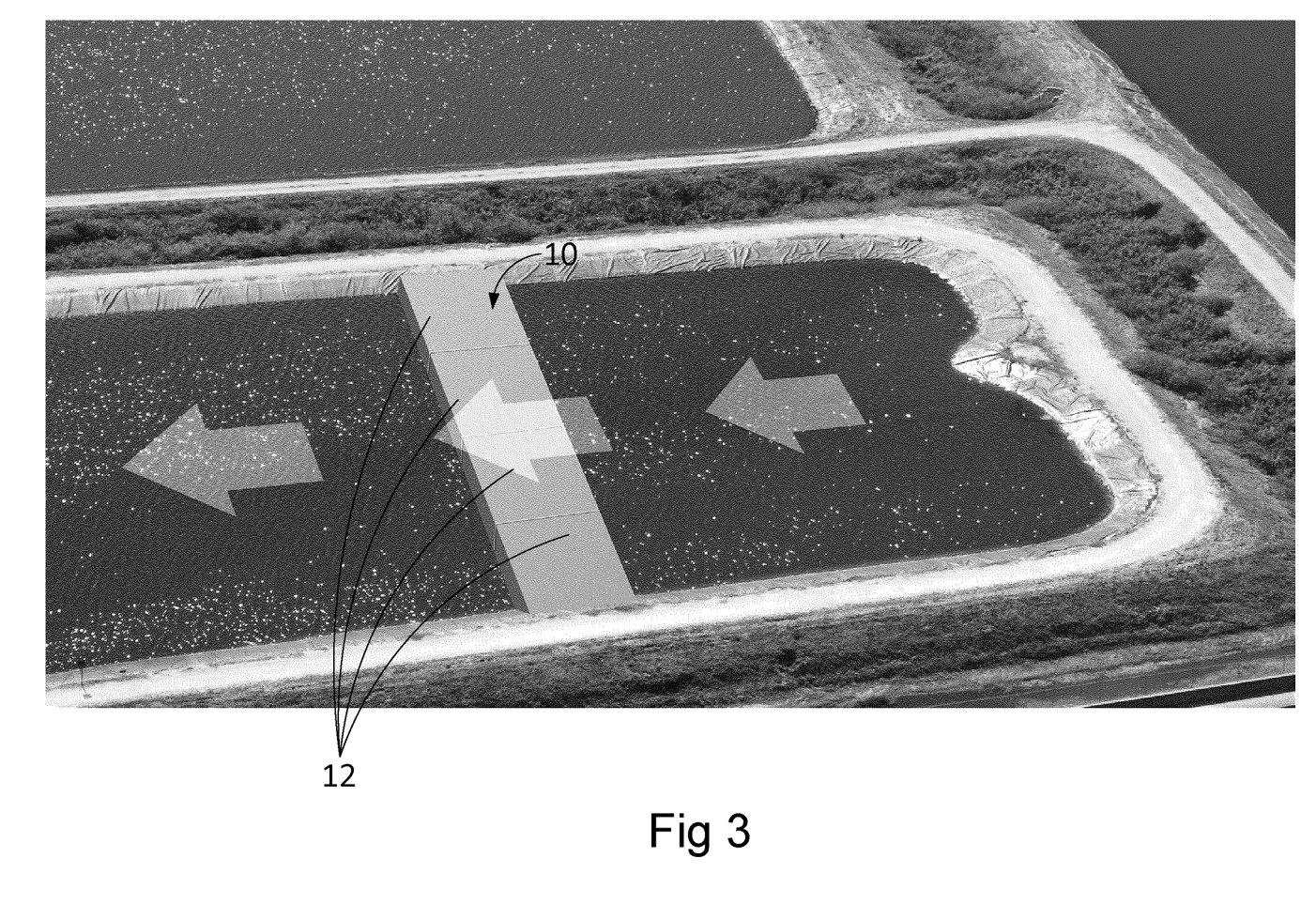
FIG. 3 is a picture illustrating a system for the treatment of wastewater, according to another embodiment of the present invention.
Figure 4:
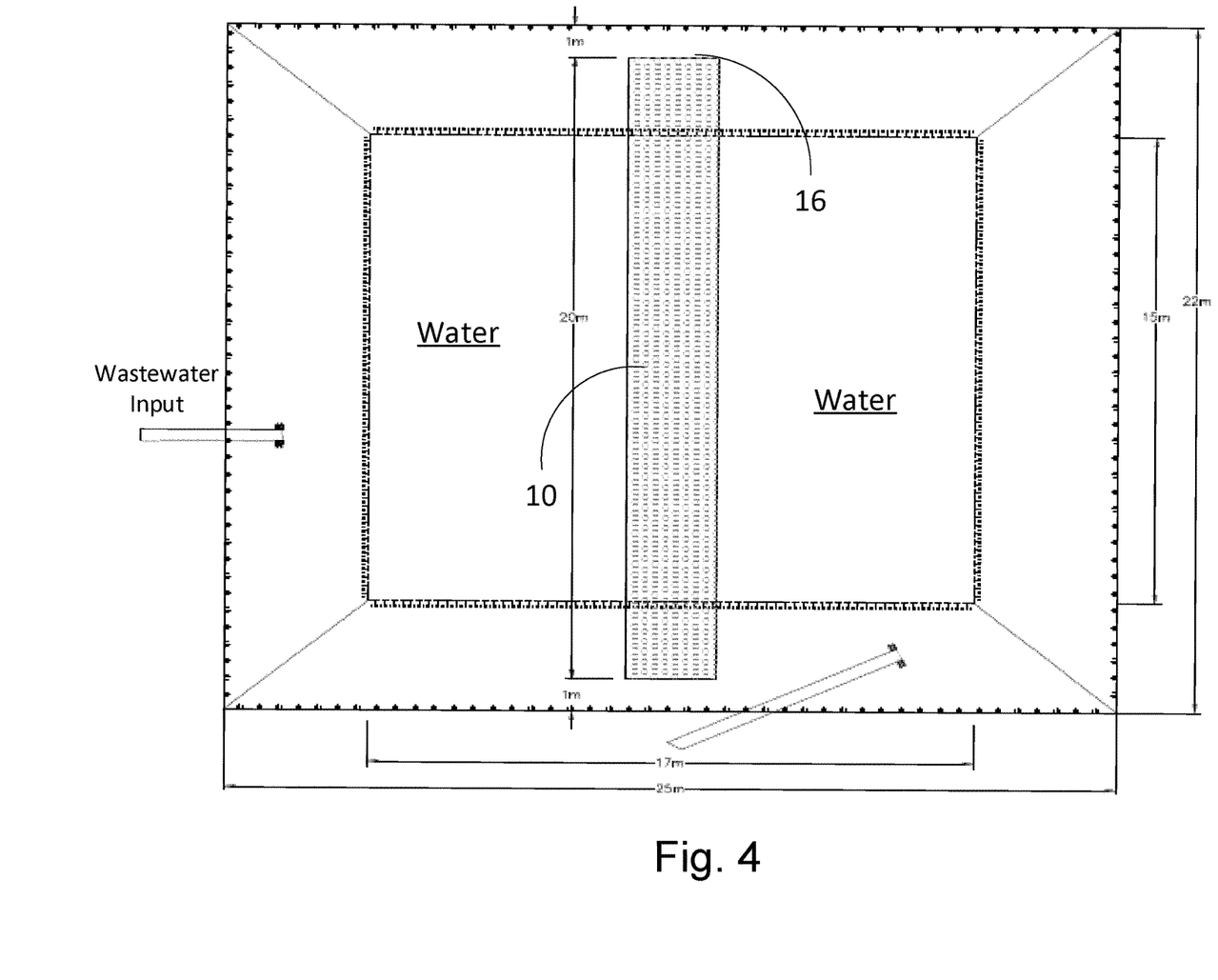
FIG. 4 is a top view illustrating a system for the treatment of wastewater, according to an embodiment of the present invention.
Figure 5:
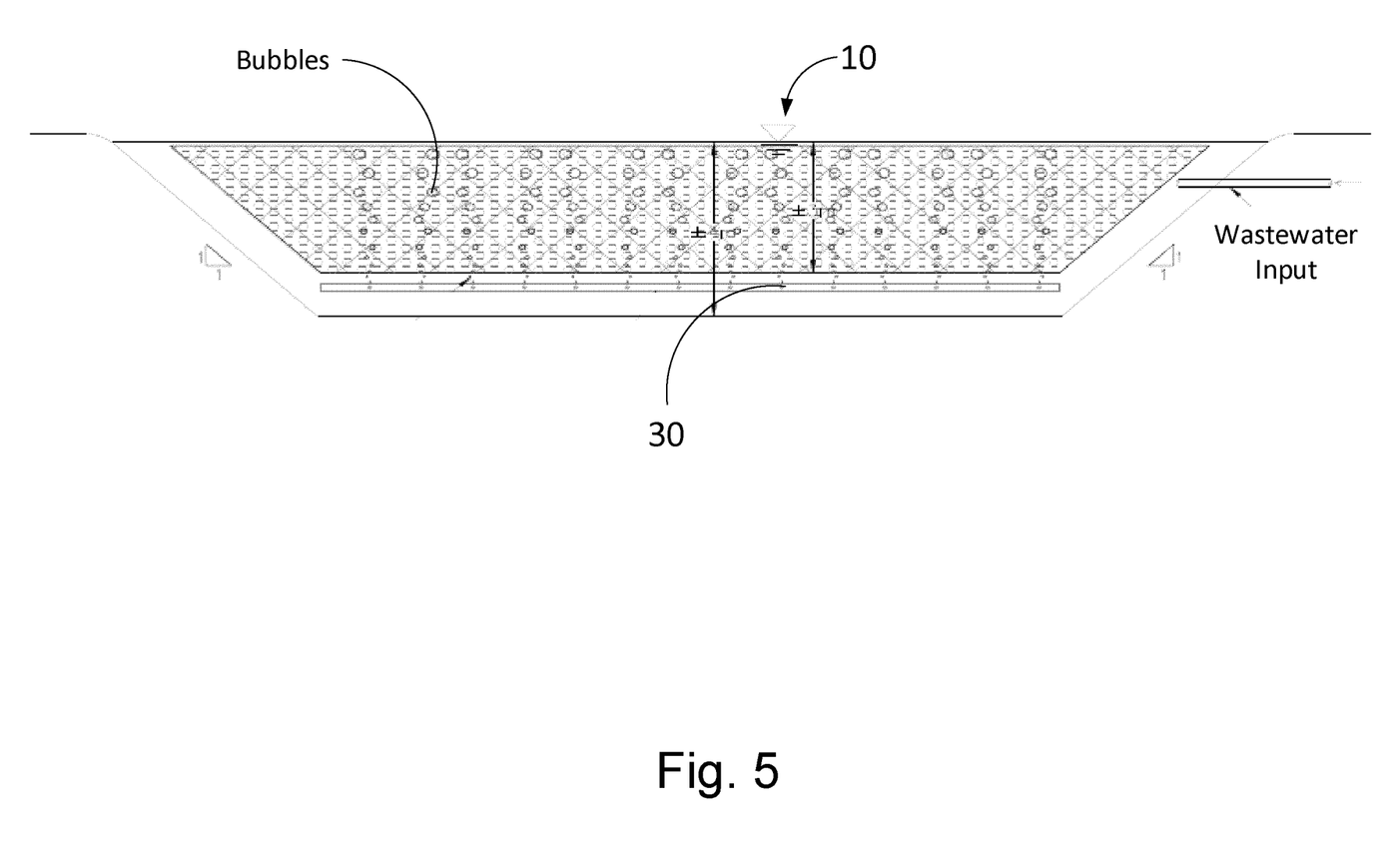
FIG. 5 is a side view illustrating the system of FIG. 5.

For greater efficiency of the system 10 for treating wastewater, the system 10 should be configured to have all wastewater in a given pond or lagoon to flow therethrough. In FIGS. 3, 4 and 5, the system 10 extends from one side of the pond or lagoon to the opposite side thereof, wherein a perpendicular flow of the wastewater exists in the pond or lagoon. It implies that the wastewater is forced to flow through the system 10 during its passage through the pond or lagoon. This is advantageous in that it does not require a system 10 that covers a substantially large (e.g. 50 to 100%) fraction of the pond or lagoon. The entirety of the volume of wastewater flowing through the pond or lagoon also flows through the system 10; bypassing of the system 10 by the wastewater is impossible.

According to an embodiment, the water flows inevitably through the system 10 only because of the configuration of the system 10 in the pond or lagoon. The water is not itself actively pushed into the system 10. Furthermore, once the water enters the system 10, it is not pumped or otherwise directed in specific locations within the system 10. There are no pipes, ducts or pumps to drive or direct the water within the pond or lagoon or within the system; once in the pond or lagoon, the water is free to flow and the configuration alone allows for a sufficient time inside the enclosure 12 to treat the water. As used herein, the terms "sufficient time", "over time" or "treatment period" refer to the amounts of time to perform the treatment of the wastewater in the pond or lagoon.

As used herein, the term "sufficient time" refers to an amount of time necessary to obtain a desired treatment of the wastewater, and obtain treated water having amounts or concentrations of pollutants within desired and/or acceptable levels. Desired may mean, for example a reduction in pollutants sufficient for the wastewater to be released for further treatment in another step of the water treatment plant, and/or it may mean a reduction in pollutants sufficient for release in the environment, or for human consumption, or other specific or desired uses. Acceptable may mean acceptable for meeting only minimum requirements; barely adequate requirements for a given purpose, for example release for a further treatment step, release in the environment, or consumption, etc.

The term "over time" refers to the time required for a given volume of wastewater (e.g. the unitary total volume of the pond or lagoon) to be treated with the system and/or the method of the present invention.

The term "treatment period" refers to the amount of time it takes for a volume of wastewater flowing through the enclosure of the present invention to be treated.

With respect to these times and/or period, the person skilled in the art will appreciate that they will vary substantially according to the nature of pollutants present in, and being degraded and/or captured in the system of the present invention. These times and periods may be in the order of minutes, hours, days, or weeks, depending on the nature of the pollutants. These times and/or periods may be adjusted by controlling the flow of the wastewater through the system of the present invention by known means within the knowledge of the person of the present invention.

Since the size of the system 10 is significant, there is enough space to allow for a diversification of the growth media 13.

The system of the present invention can, depending on its location (e.g. at the beginning or end of wastewater treatment) and depending on the media loading address different issues. For example, there could be two or more systems of the present invention for the same system of aerated ponds, but having different functions. Therefore, according to another embodiment, a plurality of enclosures 12 may be provided within the pond or lagoon. To facilitate this configuration, attachments can be provided on the enclosures 12 for example on their floatable gabion, to allow for mechanical connection between both systems. The systems 10 can thus be modular; each enclosure 12 is a module attached to its neighbor(s), which together form the modular system that covers the sufficiently large area (FIG. 1) or simply the whole width (FIGS. 3-5) of the pond or lagoon. For example, in FIG. 3, the system 10 is made of four enclosures 12 that, together, cross the whole width of the pond or lagoon. According to another embodiment, two or more system comprising a plurality of enclosures 12 of the present invention may be employed for the same system of aerated ponds, each system having a different function.

According to another embodiment, each module has a specific treatment function within the pond or lagoon. More specifically, each module (i.e., each enclosure 12 of a plurality thereof within the same pond or lagoon) can contain different growth media 13 and/or substrates, or a different combination or configuration thereof.

Indeed, as mentioned above, growth media 13 can be mixed or combined inside a given enclosure 12 to provide diversity in the pollutants that are being treated by this enclosure 12. This can also apply to modules: each module can comprise different growth media 13 and/or substrates therein or a different combination of growth media 13 and/or substrate therein. Modules can also be either fluidized or fixed media, regardless of their neighbor(s), to diversify the type of media and/or substrate. The pond or lagoon is therefore substantially covered by modules which provide a more diverse and exhaustive treatment of the wastewater by having different enclosures 12, each one being more specialized, i.e., dedicated to the treatment of some types of pollutants.

According to another embodiment, the system 10 is pre-assembled and only needs to be placed in the pond or lagoon, and anchored thereto, to be installed. The enclosure 12 may further be made to be sufficiently flexible to ease installation in the pond or lagoon.

Installing the system 10 in the pond or lagoon is advantageous in that it does not require additional space (i.e., it requires only the area of the preexisting pond or lagoon). This is therefore more advantageous than other types of treatment devices which need to be added to the side of existing ponds or lagoons to increase their treatment capacity, since these additional devices require additional space that is not always readily available. These additional devices also often imply new channels to transport water and containers to stock water; this may therefore require new infrastructures made of concrete which can be costly, hard to maintain and cumbersome.

There exist prior art systems which comprise small units that can be installed in the water to augment the treatment capacity of the pond or lagoon. However, the totality of wastewater to be treated does not pass through these units; only a fraction of the whole volume of wastewater can flow through a unit to be treated. In such a system, it is impossible to guarantee consistent performance over time.

In the present invention, providing large enclosure(s) that cross the whole width thereof ensures that most (if not all) the water will flow through the growth media 13 that will biologically remove pollutants.

The present invention will be more readily understood by referring to the following examples which are given to illustrate the invention rather than to limit its scope.

EXAMPLE 1

Detailed Wastewater Treatment Performance

A system according to the present invention comprising 3 enclosures having each dimension of 4.5 m×2.5 m×2.5 m (Length×Width×Height). The system is installed in the last third of an aerated pond, all mixed and without screening. The pond has a daily average influent flow of 350 m$^3$/day. The organic loading is 250 mg/L in DBO5, corresponding to a volumetric load of 87.5 kg/day. Each enclosure of the system is loaded with media blocs at 90%. Each media block is 10.16×5.08×5.08 cm (4×2×2 in) made of polyethylene. Each media block is composed of a series of thermos-soldered and perforated cylinder that allow the water to flow through the media but also provide a sufficient contact surface to develop the biomass which must be in contact with the water to be treated. In this example, an enclosure comprises about 64 media blocks. The enclosures may be loaded from about 40% to about 100% with media and/or substrate. Each enclosure comprises a flotation system comprising 4 floaters each, two on each side of the enclosure. All 3 enclosures are interconnected so as to form a "train-like" wall of enclosures. Each enclosure comprises an aeration system providing fine bubbles (e.g. smaller than about 1 mm at the exit of the diffuser), which provide between about 1.75 to 4 kg of O$_2$/hour (kg/h).

At the exit from the system, the treated wastewater is sampled and removal of contaminants/pollutants is assessed. The above system was found to be capable of removing the pollutants as follows:

95% of the BOD5 load;
90% of the (chemical oxygen demand) COD load;
90% of the (total suspended solids) TSS load;
35% of the total phosphorus load; and
30% of ammonia nitrogen load These results are achievable when the system is installed in the first pond or lagoon of an existing wastewater treatment plant.

While preferred embodiments have been described above and illustrated in the accompanying drawings, it will be evident to those skilled in the art that modifications may be made without departing from this disclosure. Such modifications are considered as possible variants comprised in the scope of the disclosure.

The invention claimed is:

1. A method for the treatment of a wastewater in a wastewater treatment plant, the method comprising the steps of:
    1) receiving a volume of said wastewater in a first pond or lagoon of said wastewater treatment plant, said wastewater comprising an organic load of at least 250 mg/L biological oxygen demand over 5 days (BOD5);
    2) treating said wastewater with a system comprising:
        at least one enclosure placed in the last third of said first pond or lagoon of said wastewater treatment plant, said at least one enclosure being configured to receive said volume of said wastewater from said first pond or lagoon over a treatment period, said at least one enclosure comprising therein
            a growth media for growing at least one of a bacteria or a biomass therein to perform a biological treatment of said wastewater, and
            a substrate for chemical treatment of said wastewater, said substrate comprising zeolite, aluminosilicate, charcoal, char, biochar, a microporous calcium carbonate material, or combinations thereof; and
        an aeration system, placed underneath said at least one enclosure;
    wherein during step 2), said aeration system provides oxygenation to said bacteria or biomass therein, and provides a flow of air having a velocity sufficient to cause a movement of said wastewater, within said growth media and substrate within said at least one enclosure to release live microorganisms in said wastewater within said at least one enclosure and cause a radiation effect of a treatment effect of the system beyond said at least one enclosure,
    wherein said radiation effect of a treatment effect combined with a treatment effect of said at least one enclosure, provides treatment of substantially an entire volume of water flowing through said first pond or lagoon over time.

2. The method of claim 1, wherein the system is configured to cross a whole width of said pond or lagoon.

3. The method of claim 1, wherein the at least one enclosure comprises a plurality of growth media for growth of said bacteria or biomass, and/or a plurality of substrate for chemical treatment of a toxin not degraded by biological treatment.

4. The method of claim 1, wherein the system comprises two or more enclosures and wherein each of said two or more enclosures are placed in the last third of said pond or lagoon.

5. The method of claim 4, wherein the two or more enclosures each comprise a combination of different growth media and different substrate therein.

6. The method of claim 1, wherein said growth media has a two-, or three-dimensional shape, is filled or hollow.

7. The method of claim 1, further comprising an anchoring portion, attached to said enclosure, to secure said system in place.

8. The method of claim 7, wherein said anchoring portion is configured to contact an underwater ground surface.

9. The method of claim 1, wherein said enclosure further comprises at least one live bacteria culture, a live biomass, or a combination thereof.

10. The method of claim 1, wherein said growth medium is a fluidized medium, a fixed medium, or a combination thereof.

11. The method of claim 1, further comprising a monitoring system, operatively connected to said system and configured to obtain and communicate measurements concerning the performance of said system.

12. The method of claim 1, further comprising a sludge removal system.

13. The method of claim 1, wherein the enclosure is floatable.

\* \* \* \* \*